United States Patent [19]

Koga

[11] Patent Number: 6,078,268
[45] Date of Patent: Jun. 20, 2000

[54] RADIO SELECTIVE CALL RECEIVER IN WHICH CALL COUNT AND FEE ARE INFORMED

[75] Inventor: Kuniaki Koga, Shizuoka, Japan

[73] Assignee: NEC Corporation, Tokyo, Japan

[21] Appl. No.: 08/971,697

[22] Filed: Nov. 17, 1997

[30] Foreign Application Priority Data

Dec. 12, 1996  [JP]  Japan .................................. 8-332445

[51] Int. Cl.⁷ .................................................. G08B 5/00
[52] U.S. Cl. ...................... 340/825.44; 455/407; 379/111
[58] Field of Search ....................... 340/825.44; 379/111,
379/114, 130, 131, 133, 140; 455/406,
405, 418, 407, 408, 31.1, 31.2, 140, 526,
517, 575, 130, 132; 377/13, 14, 15, 16;
705/400; 1/1

[56] References Cited

U.S. PATENT DOCUMENTS

| | | | |
|---|---|---|---|
| 4,706,272 | 11/1987 | Nishimura et al. | 455/31.2 |
| 5,109,401 | 4/1992 | Hattori et al. | 455/407 |
| 5,376,931 | 12/1994 | Marrs | 340/825.44 |
| 5,577,100 | 11/1996 | McGregor et al. | 455/406 |
| 5,625,669 | 4/1997 | McGregor et al. | 455/418 |
| 5,631,947 | 5/1997 | Wittstein et al. | 379/114 X |
| 5,809,122 | 9/1998 | Jang | 379/140 |

FOREIGN PATENT DOCUMENTS

| | | |
|---|---|---|
| 58-62961 | 4/1983 | Japan . |
| 60-169245 | 9/1985 | Japan . |
| 2-104032 | 4/1990 | Japan . |
| 3-60537 | 3/1991 | Japan . |
| 5-102911 | 4/1993 | Japan . |
| 9-102976 | 4/1997 | Japan . |
| 9-93634 | 4/1997 | Japan . |
| 9-98229 | 4/1997 | Japan . |

OTHER PUBLICATIONS

Japanese Office Action dated Jul. 27, 1999, with English language translation of Japanese Examiner's comments.
Japanese Office Action dated Sep. 22, 1998 with English language translation of Japanese Examiner's comments.

Primary Examiner—Brian Zimmerman
Attorney, Agent, or Firm—Whitham, Curtis & Whitham

[57] ABSTRACT

A radio selective call receiver includes a receiving unit which receives a call, a memory unit which stores a fee table and a call count, and a control unit which counts a number of received calls to produce the call count and which refers to the fee table to determine a fee based on the call count. The call count and fee are stores in a memory unit of the receiver in a manner suitable for recall on a display.

14 Claims, 9 Drawing Sheets

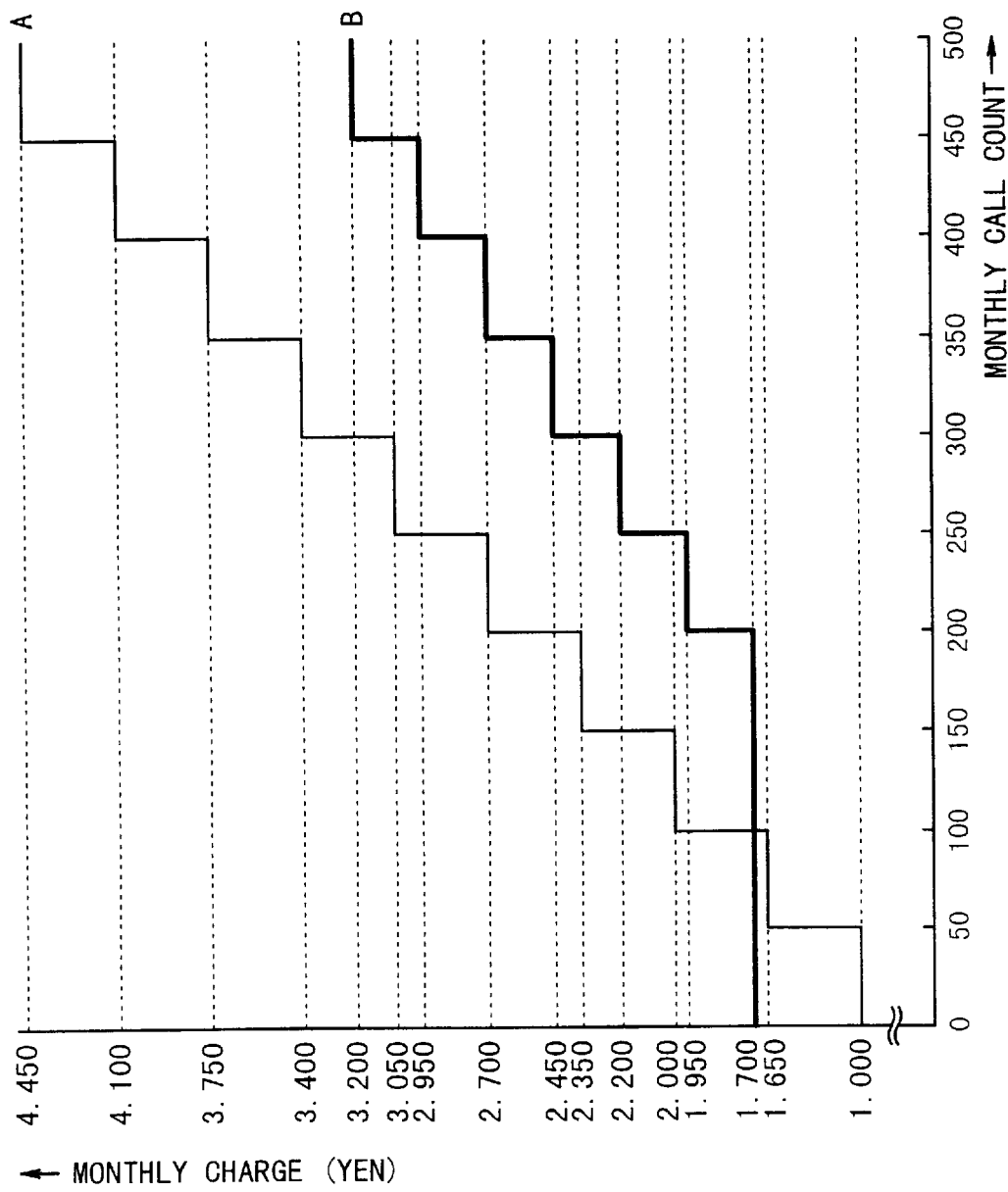

Fig. 4A

```
THE NUMBER OF TIMES OF
CALL IN THIS MONTH:158
```

Fig. 4B

```
AMOUNT OF CHARGE IN THIS
MONTH:¥1200
```

Fig. 4C

```
THE NUMBER OF TIMES OF
CALL IN THIS MONTH:158

AMOUNT OF CHARGE IN THIS
MONTH:¥1200
```

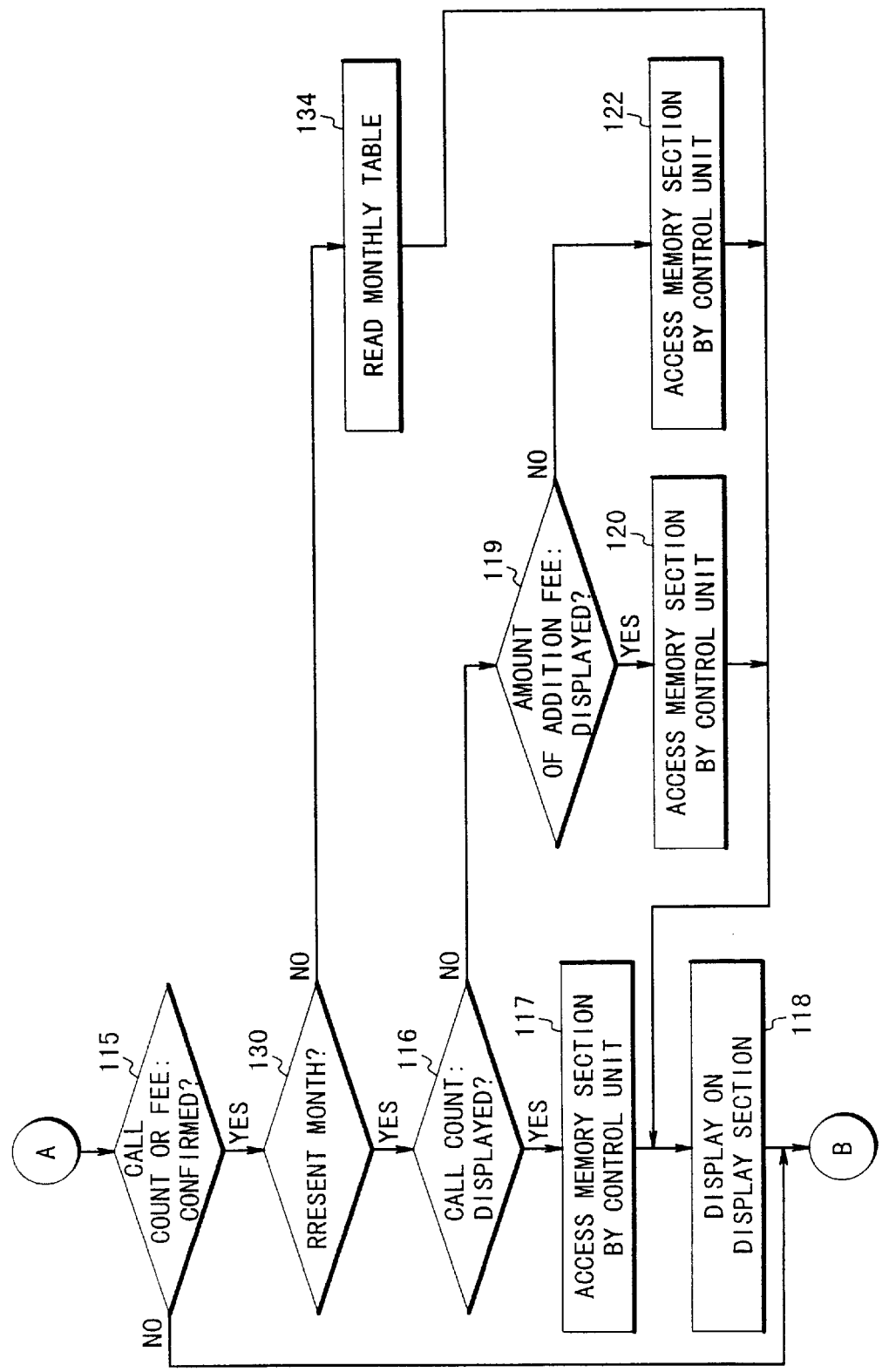

Fig. 7

| MONTH | CALL COUNT | FEE |
|---|---|---|
| 1997 APR | 190 | 1700 |
| 1997 MAY | 232 | 1950 |
| 1997 JUN | 250 | 2200 |
| 1997 JUL | 278 | 2200 |
| 1997 AUG | 312 | 2450 |
| 1997 SEP | | |

RADIO SELECTIVE CALL RECEIVER IN WHICH CALL COUNT AND FEE ARE INFORMED

BACKGROUND OF THE INVENTION

1. Field of the Invention

This invention relates to a radio selective call receiver, and more particularly to a radio selective call receiver in which a call count and fee are informed.

2. Description of the Related Art

In recent years, a charging system of the radio selective call receiver is reconsidered. That is, a conventional system is adopted in which a user of the radio selective call receiver pays a predetermined charge and a call originating person to the radio selective call receiver pays a telephone charge for every call. However, a new call count dependent on the charging system will be adopted in the future, in which an additional fee is imposed on the user of the radio selective call receiver in accordance with the reception call count, i.e., the number of reception calls.

By the way, although the additional fee is imposed on the user of the radio selective call receiver in accordance with the call count as mentioned above, the user does not generally count the reception calls one by one. Also, it is difficult to perform such a counting operation. Thus, the user cannot estimate how much additional fee is charged. Therefore, there is a problem in that there is a case that a large amount of additional fee is charged which the user does not expect. Especially, it is a serious problem for the user who receives tens of calls a day.

In Japanese Laid Open Patent Application Disclosure (JP-A-Showa 60-169245), a radio selective call receiver system is disclosed in which same information is provided to all radio selective call receivers having a same group number. However, in this system, even if the information is unnecessary to a user, the radio selective call receiver of the user receives the information, resulting in the charge of an additional fee.

SUMMARY OF THE INVENTION

The present invention is accomplished in view of the circumstances described above. Accordingly, an object of the present invention is to provide a radio selective call receiver, in which it is possible to estimate an additional fee when a new call count dependent charging system is adopted, and a method used in the same.

In order to achieve an aspect of the present invention, a radio selective call receiver includes a receiving unit for receiving a call, a memory unit storing a fee table for relation a fee and a call count, and a control unit for counting the calls received by the receiving unit to produce the call count, for referring to the fee table based on the call count to determine the fee, and for storing the call count and the fee in the memory unit.

The radio selective call receiver The further includes an input unit for inputting an instruction, and a display unit. In this case, the control unit may read the call count from the monthly table of the memory unit to display on the display unit in response to the instruction. Also, the control unit may read the fee from the memory unit to display on the display unit in response to the instruction.

The control unit may count time, store the call count and the fee in the monthly table, and reset the call count and the fee when a month changes.

Alternatively, the control unit may count time, and reset the call count and the fee when a month changes. In this case, the control unit may read the call count from the memory unit to display on the display unit in response to the instruction. Also, the control unit may read the fee from the memory unit to display on the display unit in response to the instruction. Instead, the control unit may read the call count and the fee from the memory unit to display on the display unit in response to the instruction.

When the memory unit stores a monthly table for storing the fee and the call count for every month, the control unit stores the call count and the fee in an area of the monthly table corresponding to a present month each time a call is received. Alternatively, when the memory unit further stores a monthly table for storing the fee and the call count for every month, the control unit stores the fee and the call count in an area of the month table corresponding to a present month.

In order to achieve another aspect of the present invention, a method of informing at least one of a call and a fee in a radio selective call receiver includes the steps of:

receiving a call;

counting the calls received to produce the call count;

referring to a fee table in a memory unit based on the call count to determine the fee, a fee table storing a relation a fee and a call count; and storing the call count and the fee in the memory unit.

BRIEF DESCRIPTION OF THE DRAWINGS

FIG. 2 is a diagram illustrating a new charging system;

FIGS. 4A to 4C are diagrams illustrating display examples on a display section used in the radio selective call receiver according to the first embodiment of the present invention;

FIGS. 6A and 6B are flow charts illustrating the operation of the radio selective call receiver according to the second embodiment of the present invention; and FIG. 7 is a diagram illustrating a display example on a display section used in the radio 5 selective call receiver according to the second embodiment of the present invention.

DESCRIPTION OF THE PREFERRED EMBODIMENTS

Next, a radio selective call receiver of the present invention will be described with reference to the accompanying drawings.

Figure 1:
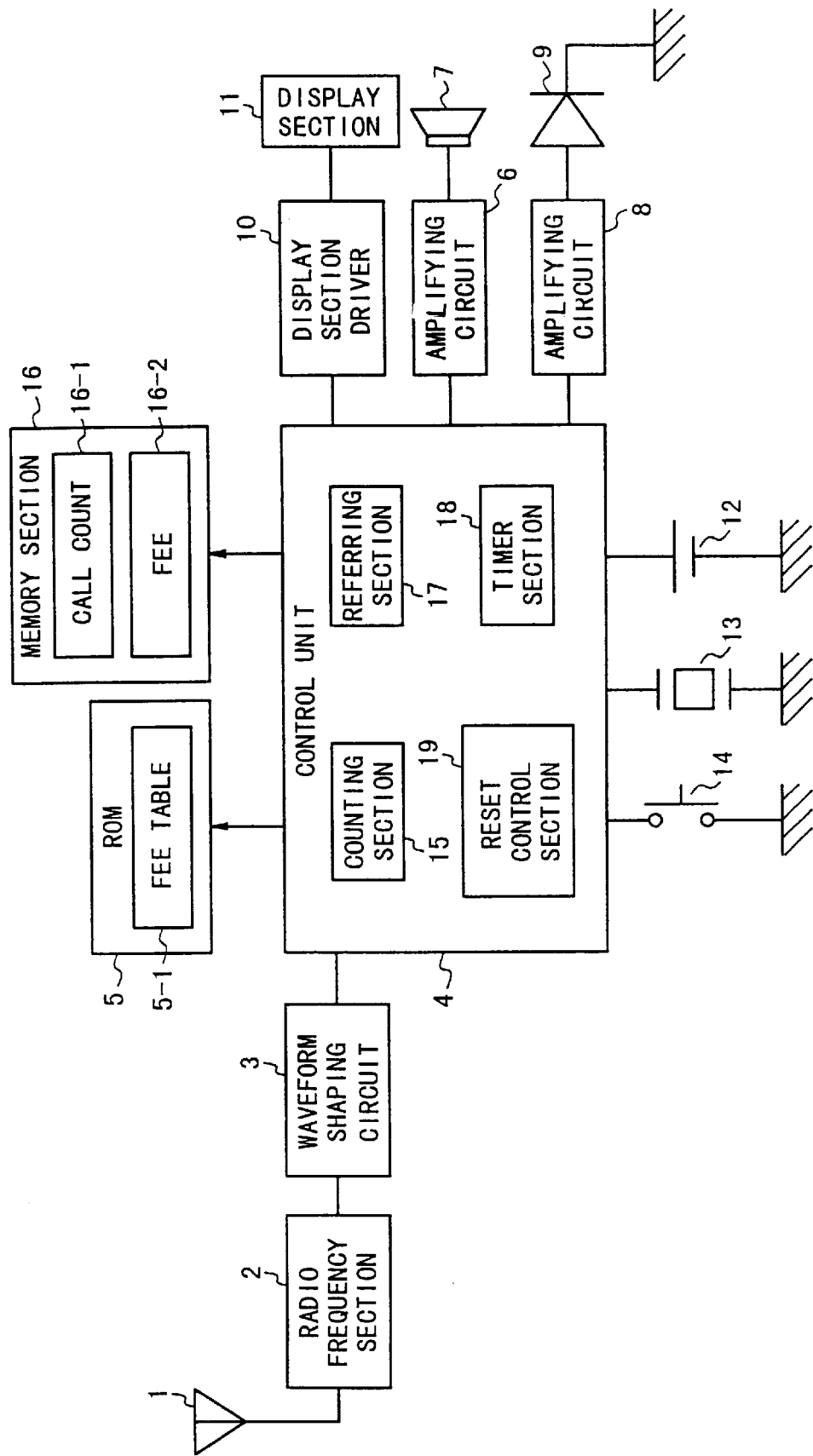
FIG. 1 is a block diagram illustrating the structure of a radio selective call receiver according to a first embodiment of the present invention.

FIG. 1 is a block diagram illustrating the structure of the radio selective call receiver according to the first embodiment of the present invention. Referring to FIG. 1, the radio selective call receiver in the first embodiment is composed of an antenna 1, a radio frequency section 2, a waveform shaping circuit 3, a control unit 4, a ROM 5, a RAM 16 as a memory section, a display section driver 10, a display section 11, amplifying circuits 6 and 8, a speaker 7, an LED 9, an input unit 14, an oscillating unit 13, and a battery 12. The control unit is composed of a counting section 15, a referring section 17, a timer section 18, and a reset control section 19. The ROM 5 stores a fee table 5-1 to be described later. The RAM 16 as the memory section stores a call count data 16-1, and a fee data 16-2.

The fee table 5-1 shows a new call count dependent charging system in which an additional fee is determined based on the monthly call count. In FIG. 2, a data plot A indicates an example of how additional fees may be calculated and a data plot B indicates another example of how additional fees may be calculated. In data plot A, the additional fee is increased for every 50 calls. On the other hand, in data plot B, additional fee is constant until the monthly call count reaches 200 calls. The additional fee is increased for every 50 calls, when the call count exceeds 200.

Referring to FIG. 1 again, the radio selective call receiver operates in response to a clock signal from the oscillator 13 based on the power from the battery 12. A wireless signal is received by the antenna 1 and then is amplified by a radio frequency section 2 for demodulation. The demodulated signal is converted into a signal having the waveform which the control unit 4 can read, by the waveform shaping circuit 3.

The control unit 4 controls each unit or section of this radio selective call receiver. When a call of the wireless signal is received by the antenna 1, the wireless unit 2, and the waveform shaping circuit 3, the control unit 4 compares a call number of the wireless signal and an identification number stored in the ROM 5. When the call number and the identification number are both coincident with each other, the control unit 4 drives the speaker 7 and the LED 9 through the amplifying circuits 6 and 8 to inform the call reception to the user with sound and light. Also, when a reception message is contained in the radio reception signal from the waveform shaping circuit 3, the control unit 4 drives the display section 11 through the display unit driver 10 to display the reception message on the display section 11.

When recognizing that the call is present, the control unit 4 sends a signal to the counting section 15 such that the counting section 15 performs the call counting operation. The counting section 15 of the control unit 4 counts up the content of the call count data in the call count area 16-1 of the memory section 16. The referring section 17 of the control unit 4 refers to the fee table 5-1 which has been previously stored in the ROM 5 based on the call count data in response to the counting operation to determine an additional fee.

When the user operates the input unit 14 to confirm the call count or the additional fee, the control unit 4 reads the call count data from the call count area 16-1 of the memory section 16 and the fee data from the fee data area 16-2 thereof. The read data is displayed on the display section 11 through the display section driver 10.

Also, the timer section 18 of the control unit 4 counts time to output time information which indicates a present time. When detecting the change in month based on this time information, the reset control unit 19 resets or clears the call count data 16-1 and the fee data 16-2 in the memory unit 16.

Figure 3A:
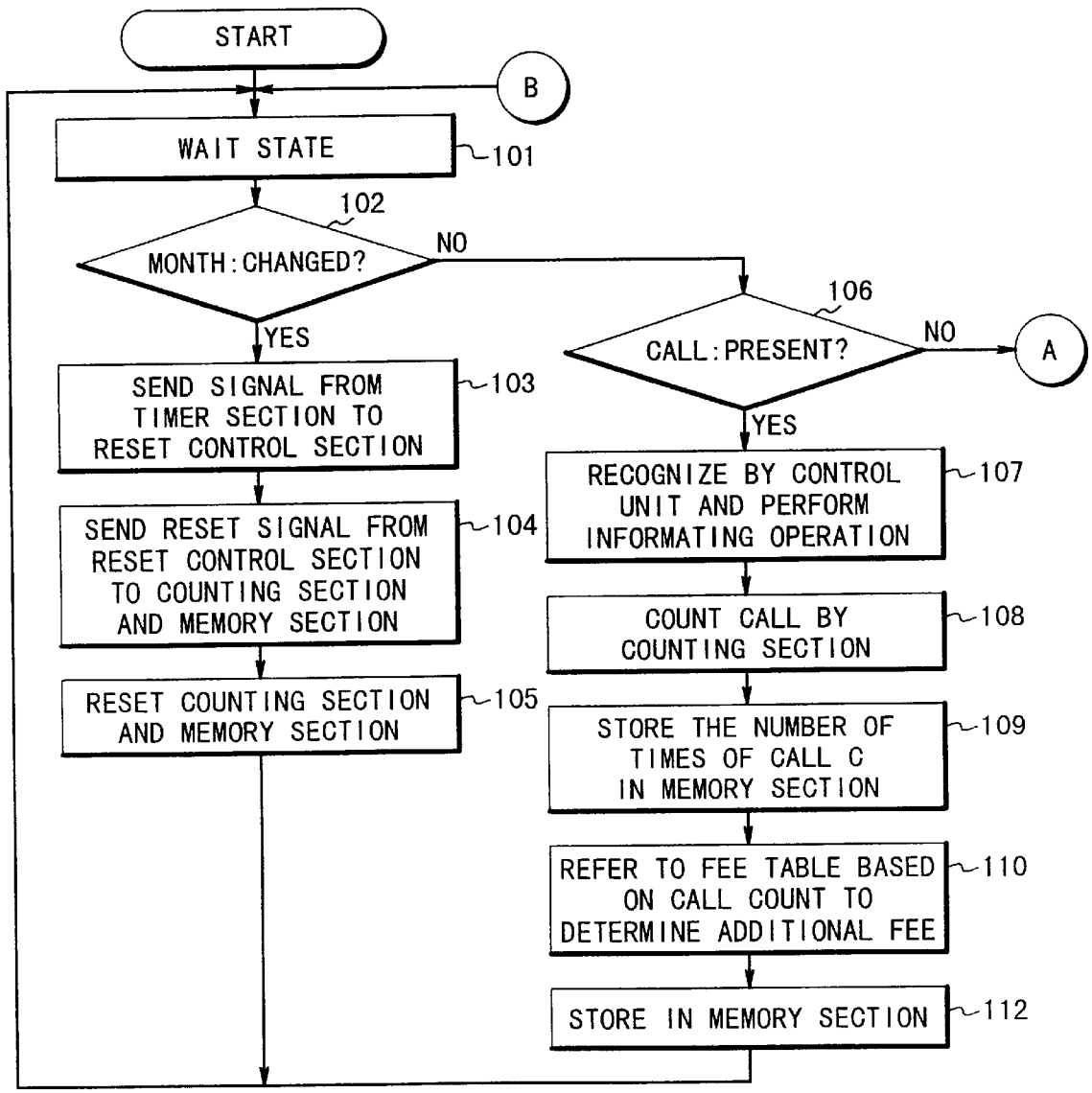
FIGS. 3A and 3B are flow charts illustrating the operation of the radio selective call receiver according to the first embodiment of the present invention.
Figure 3B:
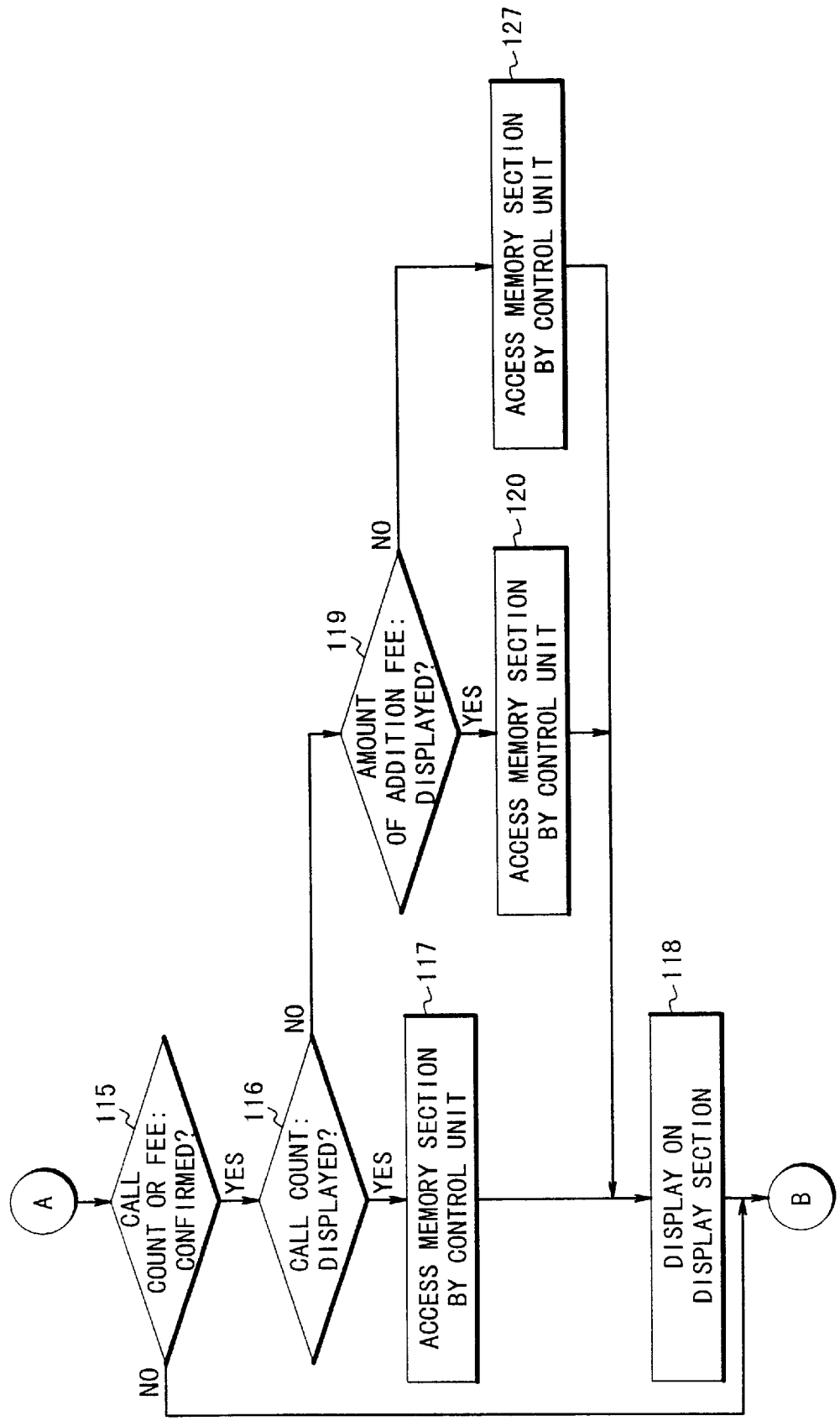
Figure 5:
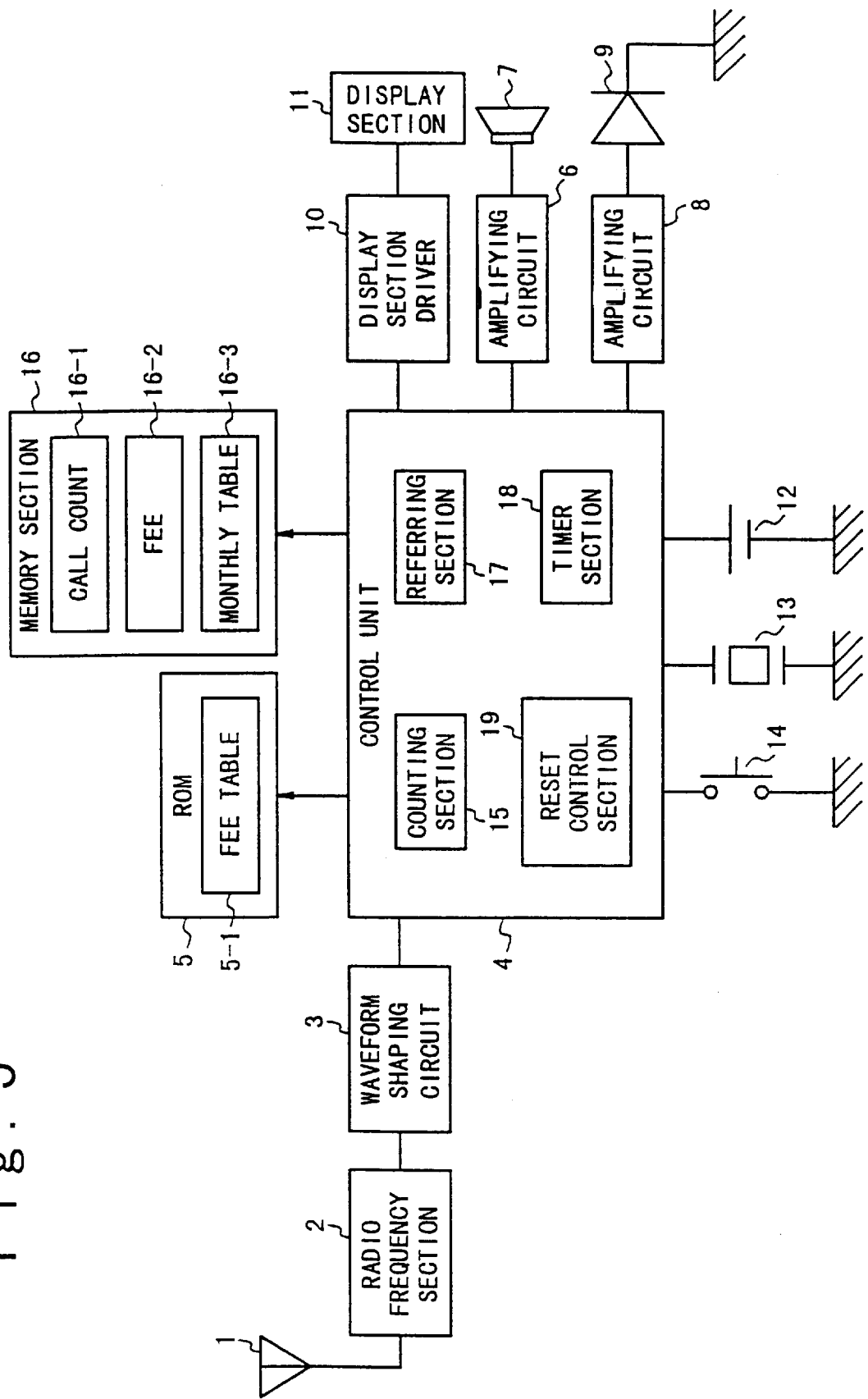
FIG. 5 is a block diagram illustrating the structure of the radio selective call receiver according to a second embodiment of the present invention.
Figure 6A:
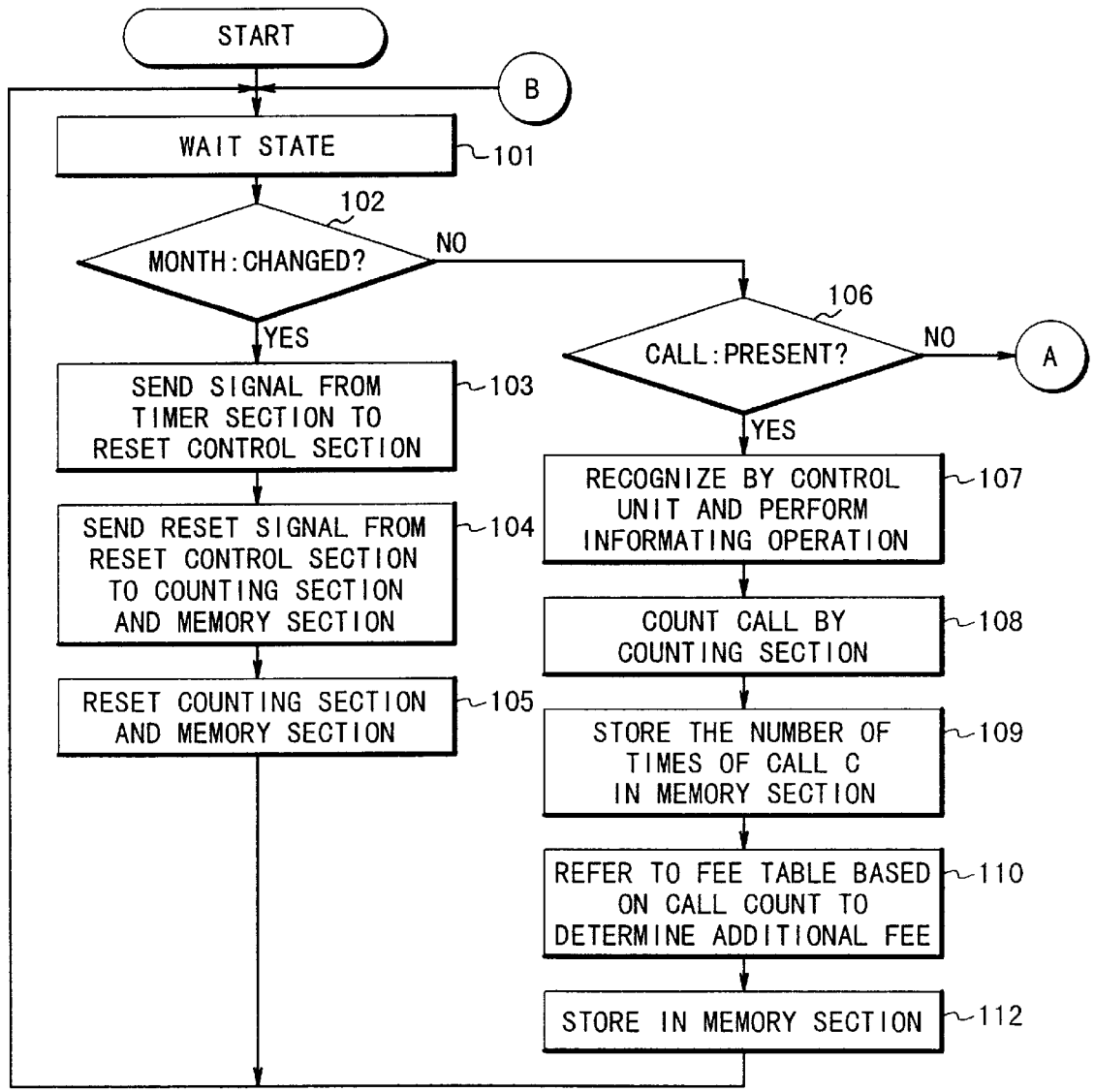

Next, the operation of the radio selective call receiver in the first embodiment will be described. FIGS. 3A and 3B are flow charts illustrating the operation of the radio selective call receiver in the first embodiment.

Referring to FIG. 3A, when the radio selective call receiver is called in the wait state (steps 101, 102 and 106), the control unit 4 performs an informing operation in which the speaker 7 and the LED 9 are driven by the amplifying circuits 6 and 8 such that the reception of a call is informed to the user (step 107). Further, the control unit 4 informs the counting unit 15 that the call is received. The counting unit 15 counts up the call count data C 16-1 in the memory section 16 (steps 108 and 109).

Next, the referring section 17 refers to the fee table 5-1 of the ROM based on the call count data C to determine the additional fee (step 110). Then, the additional fee data corresponding to the call count C is stored in the memory unit 16 (step 112).

Next, in the wait state (step 101), when the user operates the input unit 14 to confirm the call count and/or the additional fee, a confirmation mode is set to confirm the call count and/or the additional fee (steps 102, 106 and 115). Further, the user performs the selection of the object of the confirmation, i.e., the selection of the additional fee or the call count, or both (step 116 and 119).

When the user selects the confirmation of the call count, the control unit 4 reads the call count data 16-1 from the memory section 16 (step 117) to display the call count data 16-1 on the display section 11, as shown in FIG. 4A (step 118). When the user selects the confirmation of the additional fee, the control unit 4 reads the additional fee data 16-2 from the memory section 16 (step 120) to display the additional fee data 16-2 on the display section 11, as shown in FIG. 4B (step 118). When both of the call count data 16-1 and the additional fee data 16-2 are selected, the control unit 4 reads the call count data 16-1 and the additional fee data 16-2 from the memory section 16 (step 127) to display the additional fee data 16-2 on the display section 11, as shown in FIG. 4C (step 118). Thereby, the user can confirm the call count and/or the additional fee.

By the way, a call count dependent charging system is applied to the call count of one month. For this reason, the call counting operation is performed on the basis of a one-month unit in the present invention. That is, when the month changes, for example, from August to September, a control signal is sent out from the timer section 18 to the reset control section 19 (steps 101, 102 and 103). The reset control section 19 sends out a reset signal to the counting section 15 and the memory section 16 (step 104) to reset the counting section 15 and the memory section 16 (step 105).

Next, the radio selective call receiver according to the second embodiment of the present invention will be described.

The radio selective call receiver in the second embodiment has the structure similar to the first embodiment and operates in a similar manner to the first embodiment. Therefore, only the difference between the first embodiment and the second embodiment will be described.

In the second embodiment, the memory section 16 stores a monthly table 16-3 for storing the call count and the additional fee for every month of a predetermined number of months, in addition to the call count data 16-1 and the addition fee data 16-2.

In the operation, after the determination of whether the call count data or the additional fee data is confirmed is performed (step 115), it is determined whether the call count data or the additional fee data for the present month is to be confirmed (step 130). If the answer is affirmative, the step 116 is executed as in the first embodiment. If the answer is negative, a step 134 is executed. In the step 134, the control unit 4 reads the monthly table 16-3 from the memory section 16 to drive the display section driver 10 such that the monthly table 163 is displayed as shown in FIG. 7 (step 118).

Also, when the month changes (step 102), the control unit 4 writes the call count data 161 and the additional fee data 16-2 in an area of the monthly table 16-3 corresponding to the previous month.

It should be noted that the counting section 15 may update the call count of the monthly table 16-3 corresponding to the present month. In this case, the field for the call count 16-1 can be omitted. Also, the referring section 17 may write the additional fee of the monthly table 16-3 corresponding to the present month determined by referring to the fee table 5-1 based on the call count. In this case, the field for the additional fee 16-2 can be omitted. In addition, when the month changes, it becomes unnecessary for the control unit 4 to write the call count and the additional fee in the monthly table 16-3.

Further, in the second embodiment, the call count and the additional fee of the monthly table 16-3 are displayed as shown in FIG. 7. However, only the call count or only the additional fee of the monthly table 16-3 may be displayed, as in the first embodiment.

In addition, in the first and second embodiment, the referring section 17 refers to the fee table 5-1 when the call is reception and the call count data 16-1 is counted up. However, the referring section 17 may refer to the fee table 5-1 only when the display of the additional fee is requested by the user.

As described above, according to the radio selective call receiver of the present invention, since the calls are counted, the user can estimate an amount of additional fee determined in accordance with the call count. Also, there is no case that the user pays an unexpected amount of money in the payment of the additional fee. That is, because the user can prompt a call originating person to pay attention to restrict calls when the additional fee gets too large, it is possible to restrain the call count. As a result, an increase of an amount of money to be paid can be prevented. Also, as a result of the restraint of the call count, congestion of traffic is restrained and the situation in which the connection to the radio selective call receiver becomes impossible can be avoided.

What is claimed is:

1. A radio selective call receiver comprising:
    a receiving unit which receives calls;
    a memory unit which stores a fee table and a call count; and
    a control unit which counts a number of calls received by said receiving unit to produce said call count, which refers to said fee table to determine said fee based on said call count, and which stores said call count and said fee in said memory unit.

2. A radio selective call receiver according to claim 1, further comprising:
    an input unit for inputting an instruction; and
    a display unit, and
    wherein said control unit reads data stored in said memory unit to display on said display unit in response to said instruction.

3. A radio selective call receiver according to claim 2, wherein said control unit reads at least one of said call count and said fee from said memory unit for display on said display unit in response to said instruction.

4. A radio selective call receiver according to claim 2, wherein said memory unit stores a monthly table for storing fees and call counts for a predetermined plurality of months, and
    wherein said control unit reads at least one of said call count and said fee from said monthly table of said memory unit for display on said display unit in response to said instruction.

5. A radio selective call receiver according to claim 1, wherein said control unit counts time, and resets said call count and said fee when a month changes.

6. A radio selective call receiver according to claim 1, wherein said memory unit further stores a monthly table for storing said fee and said call count for a predetermined plurality of months, and
    wherein said control unit includes a timer unit for counting time, and
    wherein said control unit stores said fee and said call count in an area of said month table corresponding to a present month determined based on said counted time.

7. A method of informing at least one of a call and a fee in a radio selective call receiver comprising the steps of:
    receiving calls;
    counting said calls received to produce a call count;
    referring to a fee table in a memory unit to determine a fee based on said call count; and
    storing said call count and said fee in said memory unit.

8. A method according to claim 7, further comprising the steps of:
    reading at least one of said call count and said fee from a monthly table stored in said memory unit; and
    displaying said at least one of said call count and said fee on a display unit in response to an instruction, said monthly table storing fees and call counts for a predetermined plurality of months.

9. A method according to claim 7, further comprising the steps of:
    reading at least one of said call count and said fee from said memory unit, and displaying said at least one of said call count and said fee on a display unit in response to an instruction.

10. A method according to claim 7, further comprising the steps of:
    counting time;
    storing said call count and said fee in a monthly table; and
    resetting said call count and said fee when a month changes.

11. A method according to claim 7, further comprising the steps of:
    counting time; and
    resetting said call count and said fee when a month changes.

12. A month according to claim 7, wherein said storing step includes:
    storing said call count and said fee in an area of a monthly table corresponding to a present month each time a call is received, said monthly table storing fees and call counts for a predetermined plurality of months.

13. A method according to claim 7, wherein said storing step includes:
    storing said fee and said call count in an area of a monthly table corresponding to a present month, said monthly table storing fees and call counts for a predetermined plurality of months.

14. A radio selective calling receiver according to claim 1, wherein said fee table stores information setting forth a relationship between numbers of call counts and fees to be charged for said call counts, and wherein said control unit determines said fee by determining one of said fees in said fee table which corresponds to said call count.

* * * * *